United States Patent

Suzuki et al.

[11] 4,446,992
[45] May 8, 1984

[54] FIXED QUANTITY FEED APPARATUS

[75] Inventors: Tomosaburo Suzuki; Toshiki Kato, both of Tokyo, Japan

[73] Assignee: Kabushiki Kaisha Daisei Kikai, Tokyo, Japan

[21] Appl. No.: 122,825

[22] Filed: Feb. 19, 1980

[30] Foreign Application Priority Data

Feb. 19, 1979 [JP] Japan .............................. 54-20072[U]

[51] Int. Cl.³ ............................................. B65G 11/20
[52] U.S. Cl. .................................. 222/196; 222/409; 222/447; 193/2 B; 198/533; 198/540
[58] Field of Search ............... 222/196, 409, 447, 198, 222/80; 193/2 R, 2 B, 2 C, 2 D; 198/553, 540

[56] References Cited

U.S. PATENT DOCUMENTS

| 460,001 | 9/1891 | Dula | 222/447 X |
| 2,272,252 | 2/1942 | Sponsel | 222/409 X |
| 2,759,614 | 8/1956 | Stock | 198/533 X |
| 3,043,476 | 7/1962 | Zwarycz | 414/115 X |
| 3,988,976 | 11/1976 | Slezak | 193/2 B |
| 4,019,547 | 4/1977 | Ross | 222/196 X |

FOREIGN PATENT DOCUMENTS 52-362 6/1977 Japan .

Primary Examiner—Joseph J. Rolla
Assistant Examiner—Frederick R. Handren
Attorney, Agent, or Firm—Oblon, Fisher, Spivak, McClelland & Maier

[57] ABSTRACT

A feed apparatus in which a feed chute upstanding with its four sides surrounded, and opened at its top and bottom ends is vibratably supported and a vibrator is provided for applying vibration to the feed chute to thereby enable discharge of articles fed from the top end opening of the feed chute substantially at a given density from the bottom end opening and the flow of the articles discharged from the bottom end opening is divided with respect to length for feeding of the articles in the form of blocks, each of a fixed quantity. According to this apparatus, the fixed quantity feed of articles can be obtained, with simplicity in structure and accuracy, in the situation where the articles are packed and divided in fixed quantities.

1 Claim, 8 Drawing Figures

FIXED QUANTITY FEED APPARATUS

BACKGROUND OF THE INVENTION

1. Field of the Invention

The present invention relates to apparatuses for feeding and dividing into fixed quantities, various kinds of articles, particularly agricultural and marine products which are of indeterminate form and have been, hitherto, difficult to feed in fixed quantities, for example bean sprouts or various kinds of cut or sliced vegetables, and various kinds of food articles, for example spaghetti, noddle and the like.

2. Description of the Prior Art

Recently, various kinds of agricultural and marine products or food articles have been treated in such a manner that they are packed in a number of fixed quantities, and it has been, therefore, desirable to provide an apparatus for fixed quantity feeding, which is simple in construction.

An apparatus which has been hitherto used for these purposes, is of the type in which articles to be fed in fixed quantity are thrown into a vertically upstanding fixed chute, while the level of the articles in the fixed chute is controlled by a photoelectric tube or the like so as to be almost constant, and are subsequently divided into predetermined lengths at the bottom end of the fixed chute.

In such feed apparatus, however, articles falling through the fixed chute, for example bean sprouts or cut vegetables, are twisted or partially clogged so that their feeding density is not constant. Although the flow of the articles getting out of the fixed chute is divided according to a given length, it is difficult to obtain a fixed quantity of them and the weights of the articles packed after being divided are thus not consistent.

SUMMARY OF THE INVENTION

It is therefore the object of the invention to provide an apparatus for accordingly feeding articles in a fixed quantity, in which defects found in conventional apparatuses as mentioned above are eliminated, and which is simple in structure, economical and stable in operation.

According to the present invention, in order to achieve this object, a vibrator is provided which vibrates an upstanding feed chute with its four sides surrounded, opened at its top and bottom ends and supported vibratably, to thereby enable discharge of articles fed from the top end opening of the feed chute as a flow of articles having a density substantially constant per unit length from the bottom end of the feed chute such that this flow of articles is divided according to a given length to thereby feed the articles in the form of blocks, each of a fixed quantity.

This apparatus can feed articles which are indeterminate in form and difficult to feed in fixed quantity with high reliability and in a fixed quantity with accuracy, in spite of its simplicity in structure.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
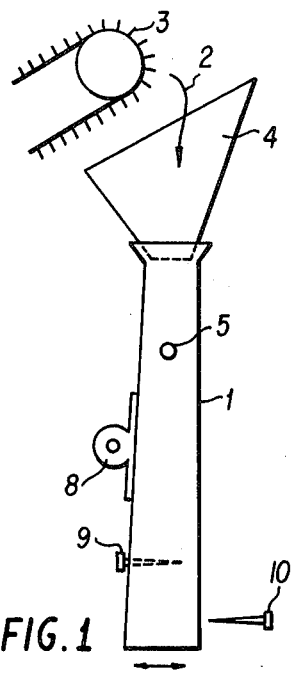
FIG. 1 and FIG. 2 are side views showing one embodiment of the fixed quantity feed apparatus according to the present invention.
Figure 2:
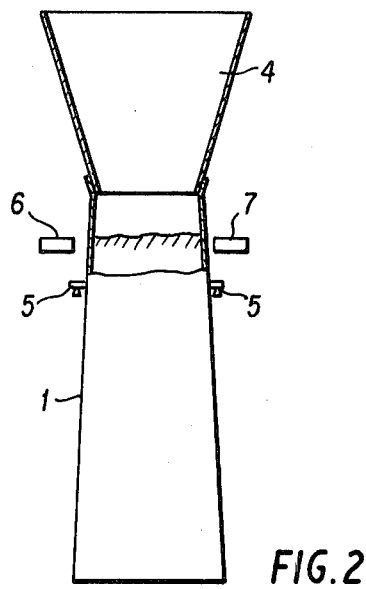

In FIG. 1 and FIG. 2, reference numeral 1 represents a feed chute for guiding articles to be fed in a fixed quantity, which is properly shaped in cross-sectional contour, for example, a circular or square form, and which is surrounded on its four sides and opened at its top and bottom ends. The feed chute 1 may be equal in cross-section at its upper and lower parts but is shaped, preferably for stable feeding, somewhat in a tapered form toward its bottom in a longitudinal section. Above the feed chute 1, a throw-in conveyor 3 is arranged which feeds articles 2 to be fed in fixed quantity, for example bean sprouts or cut vegetables to the top end of the feed chute 1.

A hopper 4 is arranged between the top end opening of the feed chute 1 and the throw-in conveyor 3, through which the articles dropping from the throw-in conveyor 3 are led to the feed chute 1. The feed chute 1 is vibratably supported around supporting shafts 5 in the direction of arrows shown in FIG. 1.

Transparent windows are provided opposite to each other at the top end of the feed chute 1 and a light-emitter 6 and a light-receiver 7 are provided, with the windows being positioned therebetween, by which the level of the articles to be fed in fixed quantity inside the feed chute 1 is detected, so that operation of the throw-in conveyor 3 is begun or stopped in response to the detection signals to thereby maintain the level of the articles in the chute 1 within a given range.

A proper type of known vibrator 8, for example electromagnetic or rotary type, is fixed on the feed chute 1, by which the chute 1 is vibrated in the direction of the arrows shown in FIG. 1. The results of experiments performed by the present invention showed that bulky articles such as cut vegetables or bean sprouts become constant in density in the feed chute due to vibrating the feed chute in this manner.

It is necessary to regulate the amplitude and frequency of vibration generated by the vibrator 8 in accordance with the size of the feed chute and the articles to be fed, and the vibrator 8 is preferably of such type that its frequency and amplitude are adjustable. In the fixed quantity feed of bean sprouts, for example, the frequency is 300–1000 cycles, preferably 500–800 cycles, and the amplitude is preferably 4–10 mm.

Figures 3A, 3B:
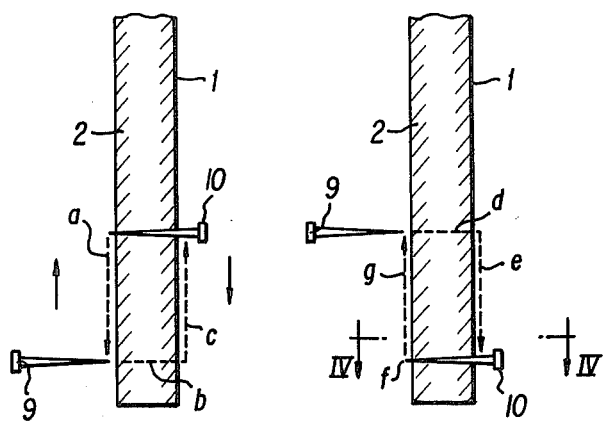
FIGS. 3A and B are illustrative views showing the operation of fixed quantity dividing device.
Figure 4:
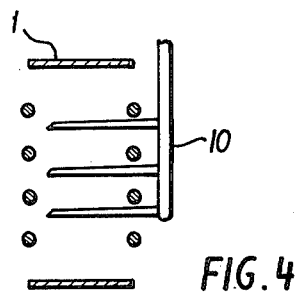
FIG. 4 is an enlarged, cross-sectional view along IV—IV of FIG. 3 showing the bottom end part of a feed chute.

At the bottom end part of the feed chute 1, slits are provided at opposite sides, through which dividing members having laterally extending pins 9,10, constituting a fixed quantity dividing device, are permitted to pass vertically. The slits may be formed as a wall face in which a plurality of parallel wires are provided as shown in FIG. 4. The dividing pins 9,10 are alternately inserted into and drawn out of the feed drum 1 as shown in FIGS. 3A and B, to divide the articles 2 at the bottom end part of the feed chute 1 with a given length. In FIG. 3, namely, the dividing pin 10 is inserted into the chute, and the distal end of the dividing pin 10 is lowered along the path a in that state.

On the other hand, pin 9 is raised, with its distal end running along the path 9 of FIG. 3B, in such state. When the dividing pin 10 is completely lowered, it is drawn out of the feed chute 1 along the path b end. The dividing pin 9 is inserted into the feed chute 1 along the path d of FIG. 3B, synchronously with the drawing motion of the dividing pin 10. Thereafter, the pin 9 moves along the path e, f and g, and the pin 10 rises along the path c and is returned to the state shown in FIG. 3A, in accordance with the drawing out of the pin 9.

Figures 5, 6:
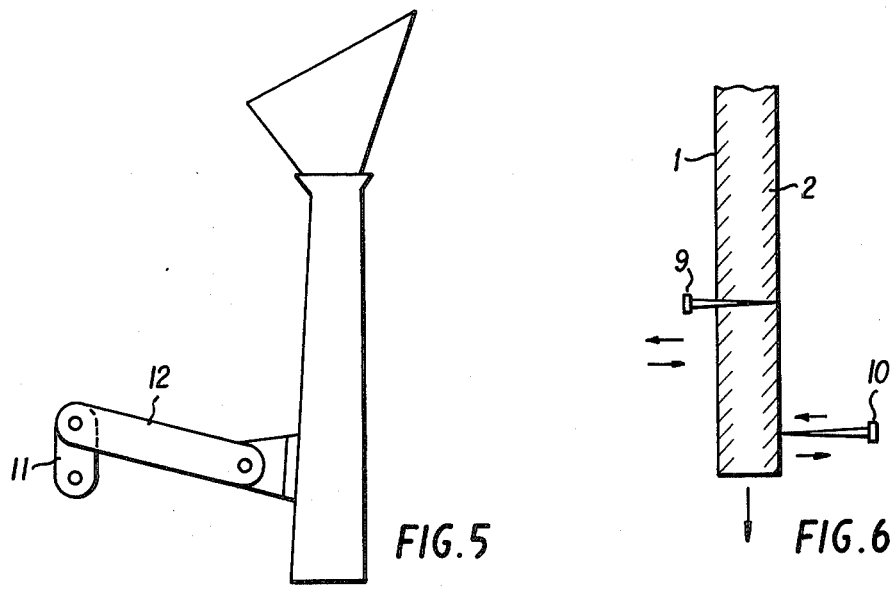
FIG. 5 is a side view showing the fixed quantity feed apparatus according to a second embodiment.
FIG. 6 is an illustrative view showing another example of the fixed quantity dividing device.

Accordingly, the articles in the chute 1 are divided by a length between both pins 9,10 by drawing of them, and are dropped and fed to a bag-packing device or the like provided under the drum 1. In the above-mentioned embodiment, in addition, an electromagnetic or rotary type vibrator is shown as vibrator 8, but a mechanical type of vibrator using an eccentric shaft 11 and a connecting link 12 as shown in FIG. 5, may be also employed. Moreover, the motion of the dividing pins 9,10 may be simplified, for example in such a manner that they do not move up and down as shown in FIG. 6, but are moved side to side synchronously with each other at a fixed horizontal position and alternatively inserted into and drawn out of the chute 1.

In the above-mentioned embodiment, furthermore, the articles are divided in the feed chute 1 at its bottom end, however the articles may be discharged from the chute in belt-like form onto a horizontal conveyor belt, and thereafter divided to a given length, as disclosed in the official gazette of Japanese Published unexamined patent application (Kokai tokkyo kohō), No. 77362/1977.

The feed chute may be not vertical but, namely, may be aslant upstanding.

Figure 7:
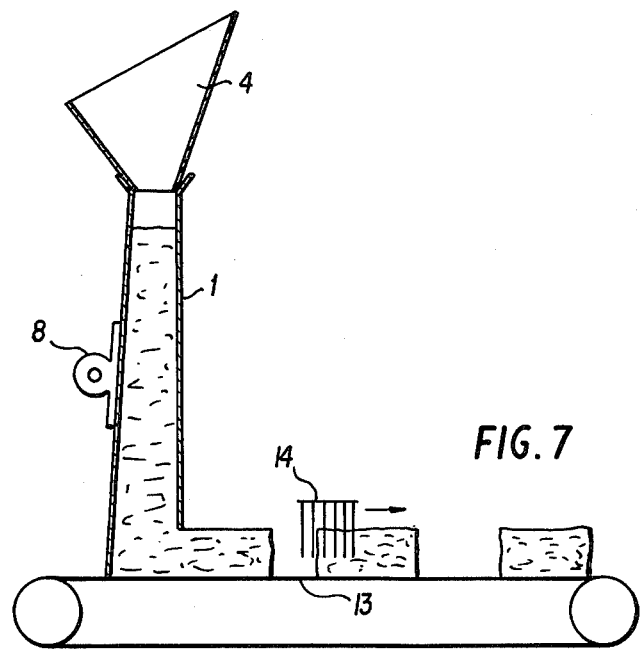
FIG. 7 shows a further example of the fixed quantity dividing device.

That is, it may be arranged as shown in FIG. 7 such that a belt-like flow of given density, such as bean sprouts, which has been discharged out of the bottom end opening of the feed chute 1, is transferred onto an endless belt 13 positioned under its bottom end opening and moving at a constant speed, and then cut by a comb-shaped member 14 to every given length, for feeding of a fixed quantity, and transferred in a fixed quantity to a packing station.

In the apparatus according to the invention, as concretely mentioned in the foregoing, articles are fed to and transferred from a feed chute upstanding with its four sides surrounded, while being vibrated, whereby cut vegetables or bean sprouts easy to twist and difficult to feed at a given density, can be transferred with nearly almost a constant given density, so that a fixed quantity dividing of them is readily achieved when they are divided to be of a given length.

According to the apparatus, furthermore, such bulky articles can be efficiently fed in a divided manner, with no clogging.

Obviously, numerous modifications and variations of the present invention are possible. It is therefore to be understood that within the scope of the appended claims, the invention may be practiced otherwise than as specifically described herein.

What is claimed as new and desired to be secured by Letters Patent of the United States is:

1. A fixed quantity feed apparatus for agricultural products, comprising:
    an upstanding feed chute having a plurality of sides, opened at top and bottom ends thereof, said sides of said feed chute being fixed to one another and gently tapering to provide a larger cross sectional area at said bottom end than at said top end;
    means for vibrating said entire feed chute;
    a conveyor for feeding articles to the top end opening of said feed chute to form a column of articles in the feed chute; and
    a fixed quantity dividing device for dividing the column of the articles of said feed chute to a given length for discharge from the bottom end opening, whereby a more uniform density of said articles along the length of said feed chute is achieved,
    said fixed quantity dividing device comprising at least a first and second pin member; means for alternately inserting said first and second pin members into said feed chute and drawing said first and second pin members from said feed chute; and means for shifting said first and second pin members along the direction of feeding of the articles.

* * * * *